United States Patent Office 2,717,837
Patented Sept. 13, 1955

2,717,837
MANUFACTURE OF YEAST

Alfred S. Schultz, New York, N. Y., and Freeman R. Swift, Englewood Cliffs, N. J., assignors to Standard Brands Incorporated, New York, N. Y., a corporation of Delaware No Drawing. Application February 26, 1952,
Serial No. 273,565

2 Claims. (Cl. 99—96)

This invention relates to the manufacture of yeast. More particularly it relates to the manufacture of active dry yeast and the manufacture of baked goods therewith.

The manufacture of bakers' yeast in the form commonly known as active dry yeast is a well-established art. Preparations containing a high proportion of viable or potentially viable cells (80% or more) are available. These active dry yeasts show a high degree of fermentative action and are durable for periods of a year or more, depending upon the temperature and other conditions of storage. In spite of these desirable qualities active dry yeast has shown a tendency to produce loaves of bread of lower volume and of coarser crumb texture than compressed yeast, the so-called "proteolytic effect." This effect is more noticeable when bakes are made with unbleached flour or without the use of dough conditioners, and is designated as being proteolytic in origin because from all appearances it is equivalent to the effect produced by the addition to bread dough of proteolytic enzymes, e. g., papain or substances known to activate proteolytic enzymes, e. g., glutathione. An active dry yeast which shows a marked proteolytic effect usually has adequate fermenting power and would still be satisfactory for leavening were it not for the poor quality of bread resulting from the proteolytic effect.

All of the yeast cultures which have been used heretofore for the production of active dry yeast are true bakers' yeasts and as such are classified as representing *S. cerevisiae*, Hansen. All of these cultures are characterized by a high glutathione content (total), namely, 7–12 milligrams per gram of dry solids. Glutathione is one of the substances primarily responsible for the crumb coarsening effect produced by deteriorated active dry yeast. According to the invention we use an *S. cerevisiae* Hansen bakers' yeast which has a markedly lower concentration of glutathione, that is, less than 5.5 mg. per gram of dry solids, which has the bios number 23 and which has the ability to metabolize glutathione.

As an example of the manner of utilizing this invention we present the following:

From a mass of bakers' yeast exposed to conditions which favor mutation and sporulation a large number of single yeast cells were isolated. Then the individual cells were separately propagated to provide individual yeast cultures which were then examined for their glutathione utilizing ability. A vigorous *S. cerevisiae* culture (American Type Culture Collection No. 11795) which had the bios number 23 and which showed the ability to utilize glutathione as a source of sulfur was selected for further propagation. It had the following characteristics:

Morphology

| | |
|---|---|
| Shape of cells | round or oval |
| Size of cells | 3 to 9 microns |
| Proportion, width to length | 1 to 1.1 |
| Growth habit in wort: | |
| Sediment | + |
| Ring | + |
| Vegetative multiplication by budding | + (often) |
| Spore formation: | + |
| Number per asc | 1 to 4 |
| Spore size (diam.) | 2 to 2.5 microns |
| Spor shape | round |
| Time required— | |
| (Hanging drop method) | 4 to 24 hours |
| (Block or carrot plug method) | 1 to 3 weeks |
| Colony Appearance: | |
| Form | rosette, knob in center, edge slightly tortuous |
| Color | gray yellow |

Biochemical features

| | |
|---|---|
| Sugars fermented with gas evolution:[1] | |
| Glucose | + |
| Galactose | + |
| Sucrose | + |
| Maltose | + |
| Raffinose | + |
| Melibiose | 1/3 only |
| Relation to oxygen: | |
| Aerobic growth | — |
| Glutathione utilization | + |
| Bios number | 23 |

[1] By Stelling-Dekker technique

This culture *S. cerevisiae* (218 type) was then propagated by conventional yeast propagation means to prepare a mass of compressed yeast suitable for further processing into active dry yeast. A parallel propagation was made of the parent culture of *S. cerevisiae* (GM type) known to be suitable for manufacture of ordinary active dry yeast. The two yeast samples were then dried on trays under identical conditions of temperature and humidity which according to experience were optimal for the production of active dry yeast. The two yeasts were then baked in a straight dough type of baking test of the kind used to prepare bread and rolls in the home. This baking test is characterized by a special sensitivity to the above mentioned inherent deficiencies of active dry yeast; namely, tendency to show a coarse structure whenever the active dry yeast used in it contains any significant proportion of a water soluble sulfhydryl compound. The characteristics of the two yeasts are shown in the table below:

| | *S. cerevisiae* (GM Type) | *S. cerevisiae* (218 Type) |
|---|---|---|
| Bios No | 23 | 23 |
| Percent Moisture | 7.98 | 8.21 |
| Glutathione Utilization | negative | positive |
| Yeast Yield (27% Solids) | 99.0 | 103.9 |
| Percent Protein (dry basis) | 41.2 | 41.4 |
| Mg. Glutathione per gram of dry yeast: | | |
| Total | 7.9 | 4.1 |
| Reduced | 7.0 | 3.7 |
| Fermentation Time | 72 | 70 |
| Proof Time | 53 | 49 |
| Loaf Volume | 1550 | 1560 |
| Proteolytic Effect | 18 (coarse crumb) | 5 (normal crumb) |

The bios number was determined by the method described by Schultz and Atkin in "Archives of Biochemistry," vol. 14, No. 3, August 1947.

The glutathione content was determined according to the method described by Woodward and Frey, J. Biol. Chem., vol. 97, page 465 (1932).

The glutathione utilization was determined by the method of Schultz and McManus, "Archives of Biochemistry," vol. 25, page 401, February 1950.

The proteolytic effect is expressed in equivalent mg. of glutathione required to produce equal crumb texture and loaf appearance.

It is apparent from these results that the *S. cerevisiae* (218 type) although essentially equivalent to the *S. cerevisiae* (GM type) in fermentation time, proof time and loaf volume, is superior to the latter with regard to the quality of the crumb, will score higher in any expert estimate of bread quality and will also be more acceptable to the consumer. A 0 to 5 bread score indicates a bread texture that compares with the texture of bread made with compressed bakers' yeast. The usual bread score for active dry yeasts is 15 or higher. Such bread exhibits a crumb that is open and coarse, which is very undesirable.

The yeasts of this invention may be propagated by the methods customarily used for the manufacture of bakers' yeast, that is, by growing in a nutrient medium with aeration. For instance, a portion of the nutrient is initially placed in a fermenter and the fermenter is stocked with the yeast. Then the remainder of the nutrients is added either fractionally or slowly and substantially continuously in accordance with the growth requirements of the yeast.

The culture can also be used as seed and a baker's yeast suitable for preparing active dry yeast can be propagated in accordance with U. S. Patent 2,029,572 wherein a high seeding rate is practiced.

In accordance with the invention the yeast may be dried to a moisture content of about 5% to about 10% and preferably about 8% and then stored in an ambient atmosphere substantially free from oxygen. For instance, the yeast may be placed in a container from which the air is evacuated, preferably so that the oxygen content is not above about 1%. If desired, the evacuated air may be replaced by an inert gas such as nitrogen.

Since certain changes may be made in the above process and the composition which embody the invention without departing from its spirit or scope, it is intended that all matter contained in the above description shall be interpreted as illustrative and not in a limiting sense. It is also to be understood that the following claims are intended to cover all of the generic and specific features of the invention herein described.

We claim:

1. A method of manufacturing an improved bakers' yeast which comprises propagating in a nutrient medium with aeration an *S. cerevisiae* Hansen bakers' yeast strain ATCC No. 11795 having the bios number 23, having a glutathione content less than 5.5 mg. per gram dry basis and having the ability to metabolize glutathione.

2. A method of preparing an improved active dry yeast which comprises drying an *S. cerevisiae* Hansen bakers' yeast strain ATCC No. 11795 having the bios number 23, having a glutathione content less than 5.5 mg. per gram dry basis and having the ability to metabolize glutathione until the yeast has a moisture content of about 5% to about 10%.

References Cited in the file of this patent

UNITED STATES PATENTS

| | | |
|---|---|---|
| 1,306,569 | Whitney | June 10, 1919 |
| 1,386,361 | Penniman | Aug. 2, 1921 |
| 1,909,011 | Riley | May 6, 1933 |
| 2,368,384 | Selman | Jan. 30, 1945 |

FOREIGN PATENTS

| | | |
|---|---|---|
| 10,061 | Great Britain | Aug. 4, 1900 |
| 12,445 | Great Britain | of 1905 |
| 27,626 | Great Britain | Dec. 14, 1905 |
| 23,224 | Great Britain | Dec. 1, 1894 |

OTHER REFERENCES

Chemical Abstracts 37: 3788 (5).